United States Patent
Park et al.

(10) Patent No.: US 7,746,434 B2
(45) Date of Patent: Jun. 29, 2010

(54) OPTICAL FILM ASSEMBLY FOR A DISPLAY DEVICE

(75) Inventors: Won-Sang Park, Yongin-si (KR); Sang-Woo Kim, Suwon-si (KR); Jae-Young Lee, Seoul (KR); Sung-Eun Cha, Geoje-si (KR); Jae-Ik Lim, Chuncheon-si (KR); Jae-Hyun Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1274 days.

(21) Appl. No.: 11/011,215

(22) Filed: Dec. 13, 2004

(65) Prior Publication Data

US 2005/0134773 A1 Jun. 23, 2005

(30) Foreign Application Priority Data

Dec. 17, 2003 (KR) .................. 10-2003-0092575

(51) Int. Cl.
*G02F 1/1335* (2006.01)
(52) U.S. Cl. ...................................... 349/117; 349/119
(58) Field of Classification Search ................. 349/114, 349/117–121

See application file for complete search history.

(56) References Cited

U.S. PATENT DOCUMENTS

| | | | | |
|---|---|---|---|---|
| 5,519,523 A | * | 5/1996 | Madokoro et al. | 349/117 |
| 5,541,753 A | | 7/1996 | Raynes et al. | |
| 6,204,904 B1 | * | 3/2001 | Tillin et al. | 349/119 |
| 6,295,109 B1 | * | 9/2001 | Kubo et al. | 349/119 |
| 6,496,241 B1 | * | 12/2002 | Tillin | 349/117 |
| 6,774,977 B1 | * | 8/2004 | Walton et al. | 349/177 |

FOREIGN PATENT DOCUMENTS

| | | |
|---|---|---|
| CN | 1114426 | 1/1996 |
| JP | 10-068816 | 3/1998 |

\* cited by examiner

*Primary Examiner*—David Nelms
*Assistant Examiner*—David Y Chung
(74) *Attorney, Agent, or Firm*—Innovation Counsel LLP

(57) ABSTRACT

An LCD apparatus including a first member, a second member, a liquid crystal layer and an optical film assembly is presented. A phase delay of the optical film assembly is about $-\alpha$. In a normally white mode, the phase delay of the liquid crystal layer is about $(\lambda/2)+\alpha$ when no voltage is applied and about "$\alpha$" when voltage is applied. In a normally black mode, the phase delay of the liquid crystal layer is about "$\alpha$" when no voltage is applied, and about $(\lambda/2)+\alpha$ when voltage is applied. The phase delay between the liquid crystal layer when voltage is applied and the liquid crystal layer when voltage is not applied is about $\lambda/2$. "$\alpha$" is a positive number. By manipulating the value of $\alpha$, power consumption can be reduced. For example, the apparatus can be driven with a voltage below 2.5 V.

19 Claims, 11 Drawing Sheets

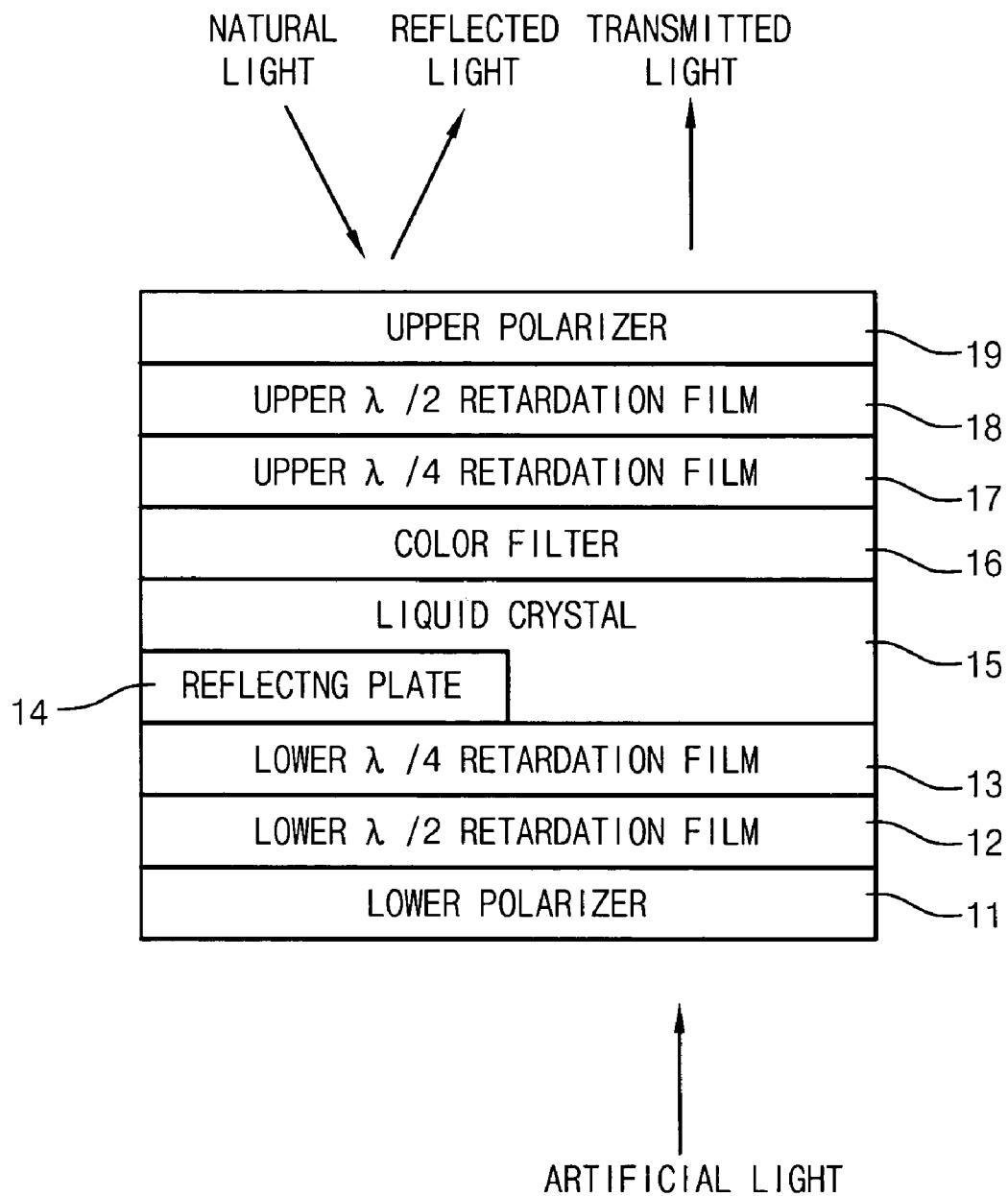

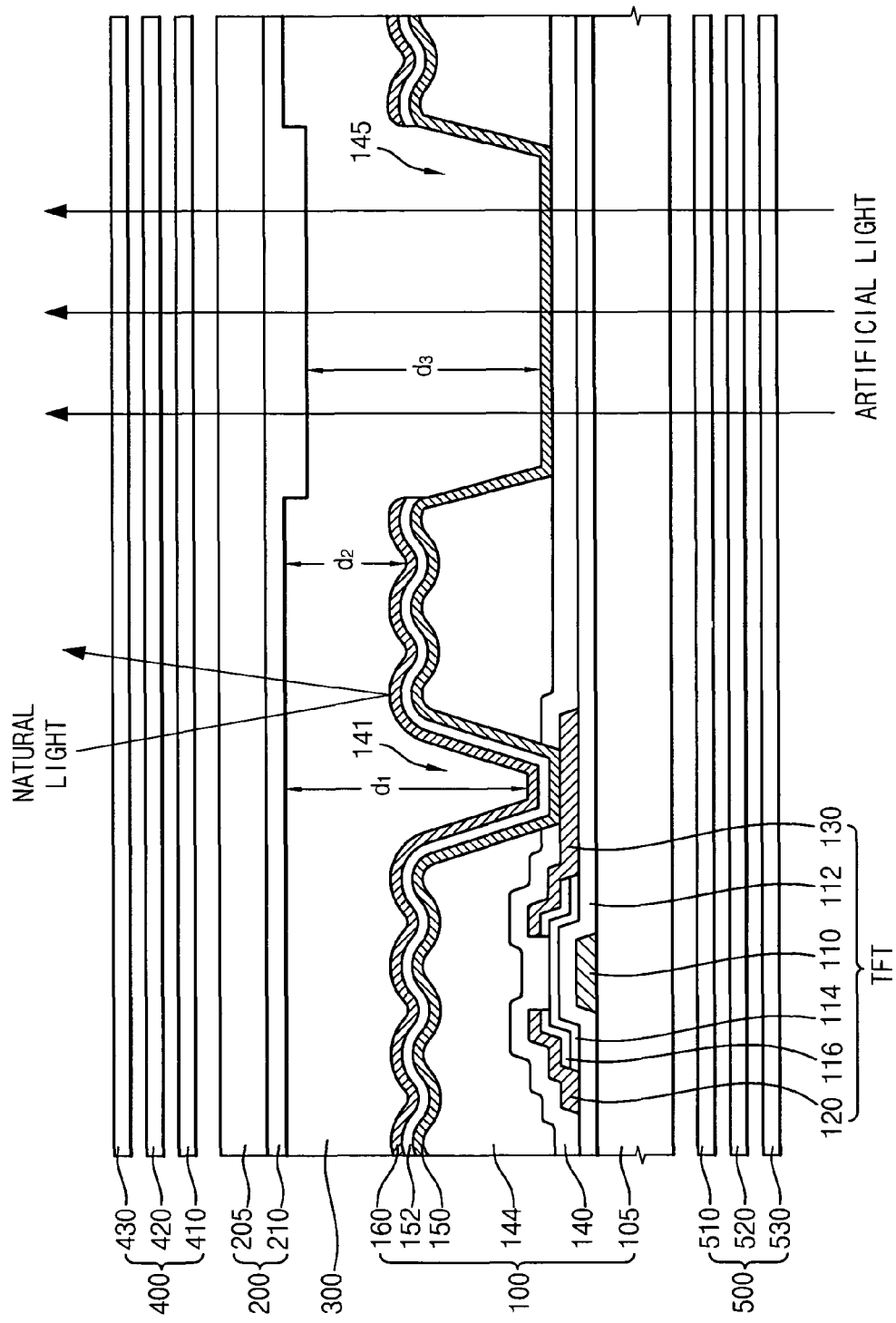

OPTICAL FILM ASSEMBLY FOR A DISPLAY DEVICE

RELATED APPLICATION

This application claims priority, under 35 U.S.C. §119, from Korean Patent Application No. 2003-92575 filed on Dec. 17, 2003, the content of which is incorporated by reference herein in its entirety.

BACKGROUND OF THE INVENTION

1. Field of the Invention

The invention relates generally to an optical film assembly and more particularly to a liquid crystal display (LCD) apparatus including the optical film assembly.

2. Discussion of the Related Art

LCD apparatuses are well known devices that are commonly used for displaying images. As display devices become more frequently integrated into portable and mobile devices, their power consumption level and size are becoming increasingly important.

Currently, there are three general types of LCD apparatuses: transmissive-type, reflective-type, and transflective type.

Since LCD itself does not generate light, a conventional transmissive-type LCD apparatus displays images by using a backlight assembly that is built into the apparatus. While the backlight assembly supplies the LCD with a constant level of light, it has the downside of dramatically increasing the apparatus' power consumption. Furthermore, the backlight assembly draws power from an additional battery, and the battery undesirably increases the size and weight of the apparatus. Currently, most transmissive-type LCD apparatuses require at least a 4 V power supply.

The reflective-type LCD apparatuses may be a lower power alternative to the transmissive-type LCD apparatus. The reflective-type LCD apparatuses consume less power because they display images by using ambient light, and therefore do not include a backlight assembly. However, the reflective-type LCD apparatuses suffer from a different downside. Since their image brightness level depends on the ambient light level, they do not offer a consistent display quality. In a dark environment, for example, the display quality may be poor due to insufficient light. Currently, the reflective-type LCD apparatuses require at least a 3.3 V power supply for providing power to the electronics supplying the signal to the LCD.

A transflective LCD apparatus, which has elements from both the reflective and the transmissive LCD apparatuses, shows a consistently good display quality and consumes less power than the transmissive LCD apparatus. However, a transflective LCD apparatus still requires at least a 4 V power supply.

FIG. 1A is a cross-sectional view showing a conventional LCD apparatus. This Figure applies to all three types of LCD apparatuses described above.

CROSS-REFERENCE TO RELATED APPLICATION

As shown in FIG. 1A, a conventional transflective LCD apparatus 10 includes a lower polarizer 11, a lower λ/2 retardation film 12 disposed on the lower polarizer 11, a lower λ/4 retardation film 13 disposed on the λ/2 retardation film 12, a reflecting plate 14 disposed on a portion of the λ/4 retardation film 13, a liquid crystal layer 15 disposed on the reflecting plate 14 and the lower λ/4 retardation film 13, a color filter 16 disposed on the liquid crystal layer 15, an upper λ/4 retardation film 17 disposed on the color filter 16, an upper λ/2 retardation film 18 disposed on the upper λ/4 retardation film 17 and an upper polarizer 19 disposed on the upper λ/2 retardation film 18. λ is the wavelength of the light that enters the LCD apparatus 10.

As is well known, the conventional transflective liquid crystal layer 15 may be operated in either normally white mode or normally black mode. In normally white mode, the phase delay experienced by a beam of light passing through the liquid crystal layer 15 is about λ/2 for a white image when no voltage is applied. When a voltage is applied in the normally white mode, the resulting image is black and its phase delay is about zero. On the other hand, in the normally black mode, the phase delay is about zero and a black image is displayed when no voltage is applied. When a voltage is applied in the normally black mode, the resulting image is white and its phase delay is about λ/2.

The retardation films 12, 13, 17 and 18 transform linearly polarized light into elliptically polarized light or a circularly polarized light. In some embodiments, the retardation films 12, 13, 17 and 18 transform an elliptically polarized light into a linearly polarized light or a circularly polarized light. Alternatively, the retardation films 12, 13, 17 and 18 may also transform a circularly polarized light into a linearly polarized light or an elliptically polarized light. The λ/2 retardation films 12 and 18 transform the direction of the linearly polarized light. The λ/4 retardation films 13 and 17 transform a linearly polarized light into a circularly polarized light, or transform a circularly polarized light into a linearly polarized light.

When the apparatus 10 is operating in the transmissive mode, the light generated from a backlight assembly (not shown) passes through the lower polarizer 11, the lower λ/2 retardation film 12, the lower λ/4 retardation film 13, the liquid crystal layer 15, the color filter 16, the upper λ/4 retardation film 17, the upper λ/2 retardation film 18 and the upper polarizer 19, in that order, to display an image. The order of layers through which the light travels depends on the configuration of the layers.

When the apparatus 10 is operating in the reflective mode, light from the environment that is incident on the upper polarizer 19 passes through the upper λ/2 retardation film 18, the upper λ/4 retardation film 17, the color filter 16 and the liquid crystal layer 15. The natural light that passes through the liquid crystal layer 15 reflects off the reflecting plate 14 and travels back through the liquid crystal 15, the color filter 16, the upper λ/4 retardation film 17, the upper λ/2 retardation film 18, and the upper polarizer 19, in that order, thereby displaying an image.

FIG. 1B and FIG. 1C are schematic diagrams of liquid crystal molecules in the liquid crystal layer 15 operating in a normally white mode. FIG. 1B shows the molecules when voltage is applied, and FIG. 1C shows liquid crystal molecules when no voltage is applied. The phase delay caused by the liquid crystal molecules in the absence of external voltage is about λ/2, and a white image is displayed. When voltage is applied, the liquid crystal molecules generate substantially no phase delay and a black image is displayed.

FIG. 1D is a graph showing the transmittance and the reflectivity of a conventional LCD apparatus. As shown in FIG. 1D, when the liquid crystal layer 15 is operating in a normally white mode (NW mode), the LCD apparatus displays a white color when a low voltage (e.g., about 1V) is applied to certain electrodes in the apparatus. Conversely, the LCD apparatus displays a black color when a high voltage (e.g., about 4V) is applied. As indicated by the legend in FIG.

1D, the two plots show the luminance in the transmission mode and the reflection mode. The two curves are similarly shaped, and the luminance level shows the same trend as the voltage is increased.

In a conventional LCD apparatus, the required driving voltage is about 4V. To provide the level of power that can drive the transflective LCD apparatus, the battery is larger and heavier than what is desirable.

A method and device that operates at a lower power consumption level without compromising the display quality is desired.

BRIEF SUMMARY OF THE INVENTION

The invention is directed to an optical film assembly and an LCD apparatus having the optical film assembly that substantially obviates one or more of the problems due to the limitations and disadvantages of the related art.

In one aspect, the invention is a liquid crystal display device that includes a first member having a first surface and a second surface, a second member having a third surface and a fourth surface, and a liquid crystal layer positioned between the first member and the second member. The liquid crystal layer generates a phase delay for light passing therethrough. The device also includes a voltage application structure for applying a voltage to the liquid crystal layer, wherein the phase delay generated by the liquid crystal layer is varied between ($\lambda/2+\alpha$) and a according to the voltage that is applied, wherein a is a non-zero value. The device further includes a compensation film coupled to at least one of the first member and the second member, wherein the compensation film generates a compensation phase delay of $-\alpha$.

In another aspect, the invention is an optical film assembly for a liquid crystal display device that includes an alignment film for aligning liquid crystal molecules of the device in an alignment direction. The optical film assembly includes a polarizer, a first phase shifting film, and a second phase shifting film. The polarizer has an optical absorption axis that is about 150±10 degrees relative to the alignment direction. The first phase shifting film is positioned on the polarizer and has a first slow axis that extends at about a 45±10 degree angle relative to the alignment direction. As for the second phase shifting film, it is positioned on the first phase shifting film and has a second slow axis that extends at a 105±10 degree angle relative to the alignment direction.

The above optical film assembly can include layers of different properties. The layers may be a polarizer having an optical absorption axis that is about 90±10 degrees relative to the alignment direction, a first phase shifting film positioned on the polarizer, and a second phase shifting film positioned on the first phase shifting film. The first phase shifting film has a first slow axis that extends at about a 105±10 degree angle relative to the alignment direction and the second phase shifting film has a second slow axis that extends at a 165±10 degree angle relative to the alignment direction.

In yet another aspect, the invention is a method of operating a display device having a liquid crystal layer. The method entails selecting a nonzero value $\alpha$ and controlling a driving voltage to adjust a phase delay generated by the liquid crystal layer between $\lambda/2+\alpha$ and $\alpha$.

BRIEF DESCRIPTION OF THE DRAWINGS

The accompanying drawings illustrate embodiments of the invention, and are included to provide a further understanding of the invention. The drawings are incorporated in and constitute a part of this specification.

FIG. 1A is a cross-sectional view of a conventional LCD apparatus;

FIG. 2A is a cross-sectional view of an LCD apparatus according to an exemplary embodiment of the present invention;

DETAILED DESCRIPTION OF THE ILLUSTRATED EMBODIMENTS

Figure 1B:
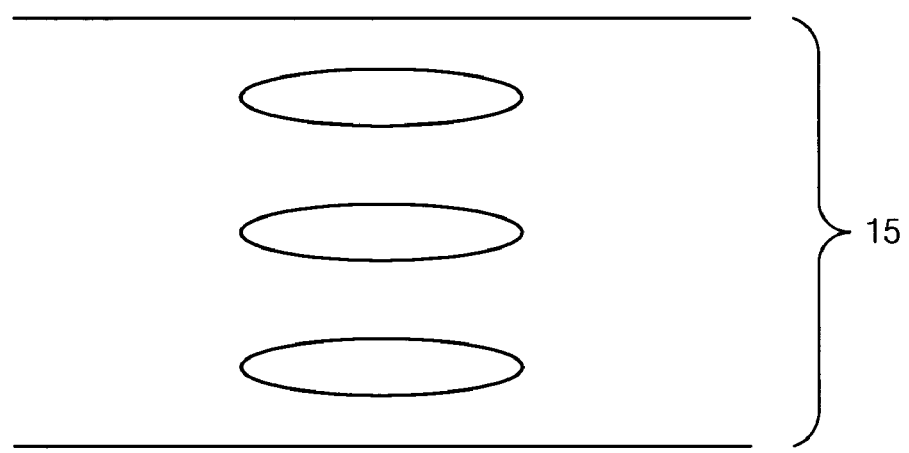
FIG. 1B is a schematic depiction of liquid crystal molecules in a conventional LCD apparatus operating in a normally white mode, when voltage is applied.

Embodiments of the invention are described herein in the context of an LCD apparatus. However, it is to be understood that the embodiments provided herein are just preferred embodiments, and the scope of the invention is not limited to the applications or the embodiments disclosed herein. For example, the invention may be adapted for other types of display or illuminating applications.

A "cell gap," as used herein, refers to a thickness of the liquid crystal layer. A "transflective" LCD apparatus is an LCD apparatus that includes a reflective region and a transmissive region. A "reflective region" is a section of the LCD apparatus that includes the reflective layer and uses ambient light to display images. A "transmissive region," on the other hand, is a section of the LCD that uses light from the backlight assembly to display images, and usually does not include a reflective layer. As used herein, "retardation" and "phase delay" refer to the product (Δnd) between the difference in the refractive index between the long and the short axes of the liquid crystal (Δn) and the thickness (d) of the liquid crystal layer. As used herein, light "passing through" a device refers to light entering and exiting the device.

FIG. 2A is a cross-sectional view of an LCD apparatus according to an exemplary embodiment of the invention. The LCD apparatus is a multi-cell-gap transflective LCD apparatus. In the embodiment of the LCD apparatus that is shown, a pixel electrode is disposed on an organic layer.

The multi-cell-gap transflective LCD apparatus includes a first member 100, a second member 200, a liquid crystal layer 300, an upper optical film assembly 400 disposed on the second member 200 and a lower optical film assembly 500 disposed under the first member 100. The liquid crystal layer 300 is interposed between the first and second members 100 and 200.

The first member 100 includes a transparent plate 105, a thin film transistor (TFT), and an organic insulating layer 144. The TFT includes a gate electrode 110 and a gate insulating layer 112 formed on the transparent plate 105, a semiconductor layer 114, an ohmic contact layer 116, a source electrode 120, a drain electrode 130, a pixel electrode 150, an interlayer 152 and a reflective plate 160.

The inorganic insulating layer 140 is formed over the transparent plate 105 having the TFT. The organic insulating layer 144 is formed over the inorganic insulating layer 140. A portion of the drain electrode 130 is exposed through a first contact hole 141, and a portion of the inorganic insulating layer 140 is exposed through an opening 145. The region including the opening 145 is the transmissive region. The organic insulating layer 144 is patterned with protrusions and grooves to improve the reflectivity of the reflective layer 160, which is conformally coated thereon.

The pixel electrode 150 is formed on the organic insulating layer 144 and electrically connected to the drain electrode 130 through the first contact hole 141. The interlayer 152 is formed on the pixel electrode 150, and the interlayer 152 that is deposited in the opening 145 is exposed. The interlayer 152 may be an insulating interlayer or a conductive layer. The reflective layer 160 is deposited over a part of the interlayer 152 to form a reflective region of the apparatus.

The pixel electrode 150 includes a transparent conductive material such as indium tin oxide (ITO), tin oxide (TO), indium zinc oxide (IZO), and zinc oxide (ZO). A capacitor line (not shown) may be spaced apart from the TFT so as to form a storage capacitor (Cst) with the pixel electrode.

The second member 200 includes a transparent plate 205, a black matrix (not shown), a color filter 210 and an overcoating layer (not shown). The black matrix (not shown) defines the red (R), green (G) and blue (B) pixel regions. The color filter 210 is formed in each of the pixel regions. The overcoating layer (not shown) is coated on the black matrix (not shown) and the color filter 210 to protect the black matrix (not shown) and the color filter 210. In some embodiments, the neighboring color filters 210 may be overlapped to form the black matrix (not shown). A common electrode (not shown) may be formed on the overcoating layer.

The liquid crystal layer 300 is interposed between the first and second members 100 and 200. As is well known, the light transmittance of the liquid crystal layer 300 varies in response to an electrical field that is formed by a voltage difference between the pixel electrode 150 and the common electrode (not shown).

In the normally white mode, the phase delay of the liquid crystal layer 300 is about $(\lambda/2)+\alpha$ and white color is displayed when polarizers 430, 530 are non-parallel and no voltage is applied to the common electrode and the pixel electrode 150. "α" has a non-zero value. The phase delay of the liquid crystal layer 300 is about "α" if a voltage is applied to the common electrode and the pixel electrode 150.

The phase delay of the liquid crystal layer 300 in the opening 145 is about $(\lambda/2)+\alpha$ if no voltage is applied to the common electrode and the pixel electrode 150. The phase delay of the liquid crystal layer 300 in the opening 145 is about "α" if voltage is applied to the common electrode and the pixel electrode 150. The phase delay of the liquid crystal layer 300 in the reflective region is about $[(\lambda/4)+\alpha]/2$ if no voltage is applied to the common electrode and the pixel electrode 150. The phase delay of the liquid crystal layer 300 in the reflective region is about α/2 if voltage is applied to the common electrode and the pixel electrode 150. Since the cell gap in the reflective region is less than the cell gap in the transmissive region (see FIG. 2A), the amount of phase delay that is generated in a single pass through the liquid crystal layer is less in the reflective region than in the transmissive region. However, because light passes through the liquid crystal layer twice in the reflective region and once in the transmissive region, about the same amount of phase delay can be achieved in both regions.

In the normally black mode, the phase delay of the liquid crystal layer 300 is about "α" and black color is displayed when the polarizers 430, 530 is non-parallel and no voltage is applied to the common electrode and the pixel electrode 150. As in the normally white mode described above, "α" is a positive number. The phase delay of the liquid crystal layer 300 is about $(\lambda/2)+\alpha$ and white color is displayed when the polarizers 430, 530 are non-parallel if voltage is applied to the common electrode and the pixel electrode 150.

In particular, the phase delay of the liquid crystal layer 300 in the opening 145 is about "α" if no voltage is applied to the common electrode and the pixel electrode 150. The phase delay of the liquid crystal layer 300 in the opening 145 is about $(\lambda/2)+\alpha$ in case that the voltage is applied to the common electrode and the pixel electrode 150. A phase delay of the liquid crystal layer 300 in the reflection region is about α/2 if no voltage is applied to the common electrode and the pixel electrode 150. The phase delay of the liquid crystal layer 300 in the reflective region is about $[(\lambda/4)+\alpha]/2$ if voltage is applied to the common electrode and the pixel electrode 150.

The difference in phase delay between the liquid crystal layer 300 when voltage is applied and when no voltage is applied is about λ/2 whether the LCD apparatus operates in the normally white mode or the normally black mode. Generally, "λ" is a wavelength in the range of from about 460 nm to about 550 nm.

The driving voltage to be applied is determined in response to "α." The driving voltage is the voltage difference between the data voltage and the common voltage of the LCD apparatus. The "data voltage" is voltage that is applied to the drain electrode 130 through the data line of each pixel for displaying an image. The common voltage is voltage that is applied to the common electrode.

The voltage that is generally applied to a conventional LCD apparatus having a driving voltage of about 4V and a phase delay of a liquid crystal layer of λ/2 is between about 0.8 V and about 4 V.

The "α" of an LCD apparatus having a driving voltage of 2.2 V is λ/4. Thus, the theoretical phase delay of the liquid crystal layer 300 is 3λ/4. However, the actual phase delay of the liquid crystal layer 300 may not be 3λ/4 because the increment of the phase delay of the liquid crystal layer 300 is non-linear.

Equation 1 represents a relationship between the driving voltage and "α":

$$(Vsu-Vth)/(Vs-Vth) \times 0.3\lambda < \alpha < (Vsu-Vth)/(Vs-Vth) \times 0.7 \lambda \quad (Eq. 1)$$

In this equation, Vsu is the desired saturation voltage of the liquid crystal layer 300. Vs is the actual saturation voltage of the liquid crystal layer 300, and Vth is the actual threshold voltage of the liquid crystal layer 300. For example, when Vsu, Vs and Vth are respectively 2.5 V, 4 V and 0.7 V, "α" ranges from about 0.162λ to about 0.378 λ.

Referring again to FIG. 2A, the thickness of the liquid crystal layer 300 in the contact hole 141, the rest of the reflective region, and the opening 145 are all different. The thickness of the liquid crystal layer 300 in the reflective-region other than the contact hole 141 is indicated by "d2." The thickness of the liquid crystal layer 300 in the opening 145 is represented by "d3." Generally, "d3" is greater than "d2." Suppose there is a conventional liquid crystal layer with a phase delay of between λ/2 and 0, wherein the thickness of its liquid crystal layer in the reflective region other than the contact hole is indicated by "d4" (not shown in the FIG.) and the thickness of the liquid crystal layer in the opening is "d5" (not shown in the FIG.). Comparing this conventional liquid crystal layer with the liquid crystal layer 300, d2 is greater than d4 and d3 is greater than d5. For example, if d4=1.6 μm and d5=3.3 μm in a conventional liquid crystal layer, d2 and d3 may be 2.0 μm and 3.7 μm, respectively.

An anisotropic refractive index of the liquid crystal layer 300 is Δn, and the thickness of the liquid crystal layer 300 is "d." The phase delay of the liquid crystal layer 300 is Δnd. The phase delay of the liquid crystal layer 300 in the contact hole 141 is Δnd1. The phase delay of the liquid crystal layer 300 in the reflective region is Δnd2. The phase delay of the liquid crystal layer 300 in the opening 145 is Δnd3.

The thickness d2 of the liquid crystal layer 300 in the reflective region and the thickness d3 of the liquid crystal layer 300 in the opening 145 are determined based on the optical film assembly.

Preferably, the liquid crystal layer 300 is homogeneously aligned. The twist angle of the homogeneously aligned liquid crystal layer 300 is about zero. To achieve the zero twist angle, the first alignment layer (not shown) disposed on the first member 100 is rubbed in a first direction, and a second alignment layer (not shown) disposed on the second member 200 is rubbed in a second direction that is opposite of the first direction. Methods of rubbing LCD alignment layers are well known.

Alternatively, the LCD apparatus may operate in in-plane switching (IPS) mode, fringe field switching (FFS) mode, coplanar electrode (CE) mode, etc. For these modes, the common electrode may be disposed with the pixel electrode 150 on the first member 100.

The first optical film assembly 500 includes a first λ/4 retardation film 510 disposed under the first member 100, a first λ/2 retardation film disposed under the λ/4 retardation film 510 and a first polarizer 530 disposed under the λ/2 retardation film 520. The second optical film assembly 400 includes a second λ/4 retardation film 410 disposed on the second member 200, a second λ/2 retardation film 420 disposed on the λ/4 retardation film 410, and the second polarizer 430 disposed on the λ/2 retardation film.

Figure 1C:
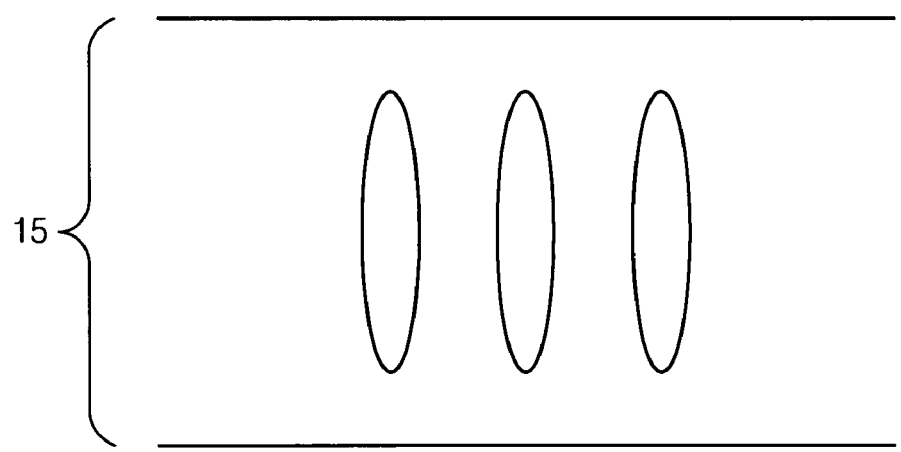
FIG. 1C is a schematic depiction of liquid crystal molecules in a conventional LCD apparatus operating in a normally white mode, when no voltage is applied.
Figure 1D:
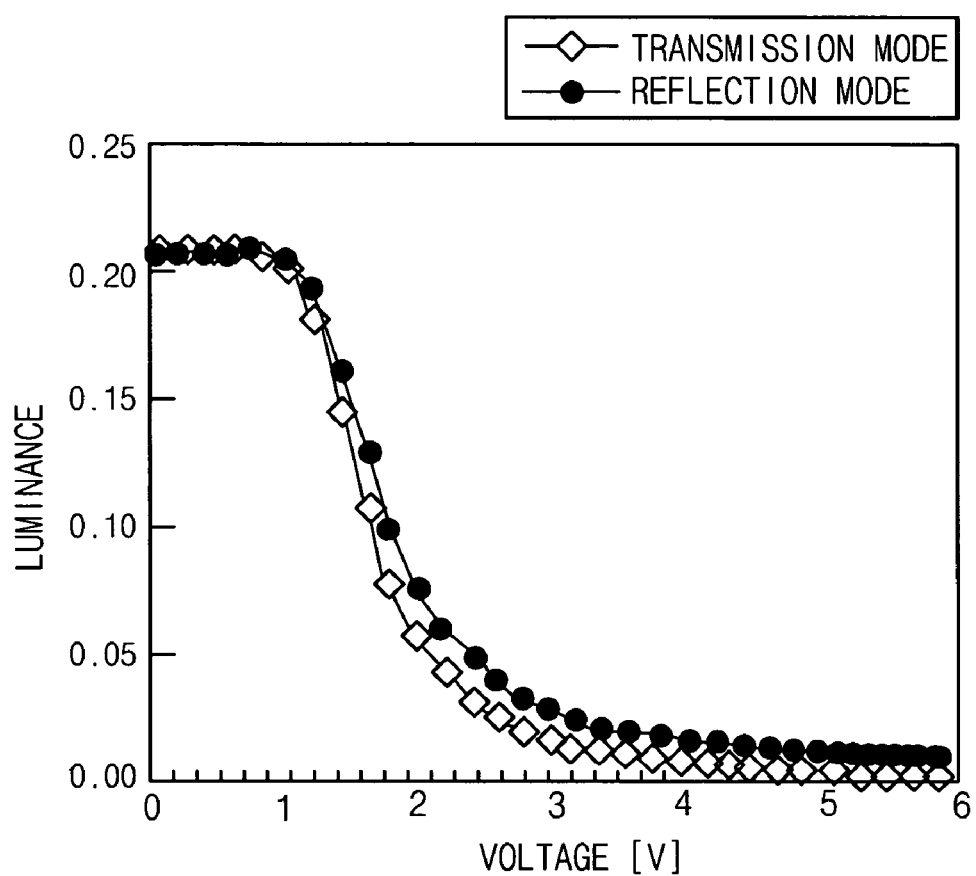
FIG. 1D is a graph of luminance a function of voltage for a conventional LCD apparatus.
Figure 2B:
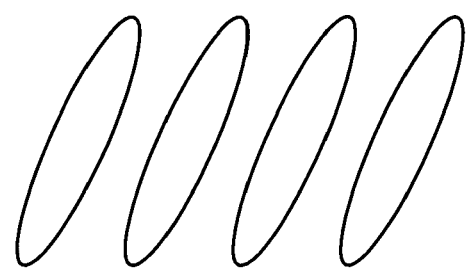
FIG. 2B is a schematic depiction of liquid crystal molecules in an exemplary version of the LCD apparatus of the invention operating in a normally white mode where voltage is applied.
Figure 2C:
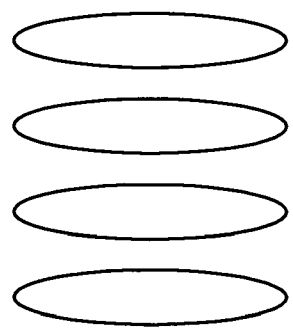
FIG. 2C is a schematic depiction of the liquid crystal molecules of FIG. 2B where no voltage is applied.

FIG. 2B is a schematic depiction of the liquid crystal molecules operating in a normally white mode where a voltage is applied. Light passing through the liquid crystal molecules of FIG. 2B experience a phase delay of α. FIG. 2C is a schematic depiction of liquid crystal molecules in an exemplary version of the LCD apparatus of the invention operating in a normally white mode where no voltage is applied. The liquid crystal molecules are aligned such that light passing through them experiences a phase delay of λ/2+α when no voltage is applied. The liquid crystal molecules of the invention generate a phase delay of a relative to the phase delays generated by the conventional liquid crystal molecules (see FIG. 1B and FIG. 1C).

Figure 3:
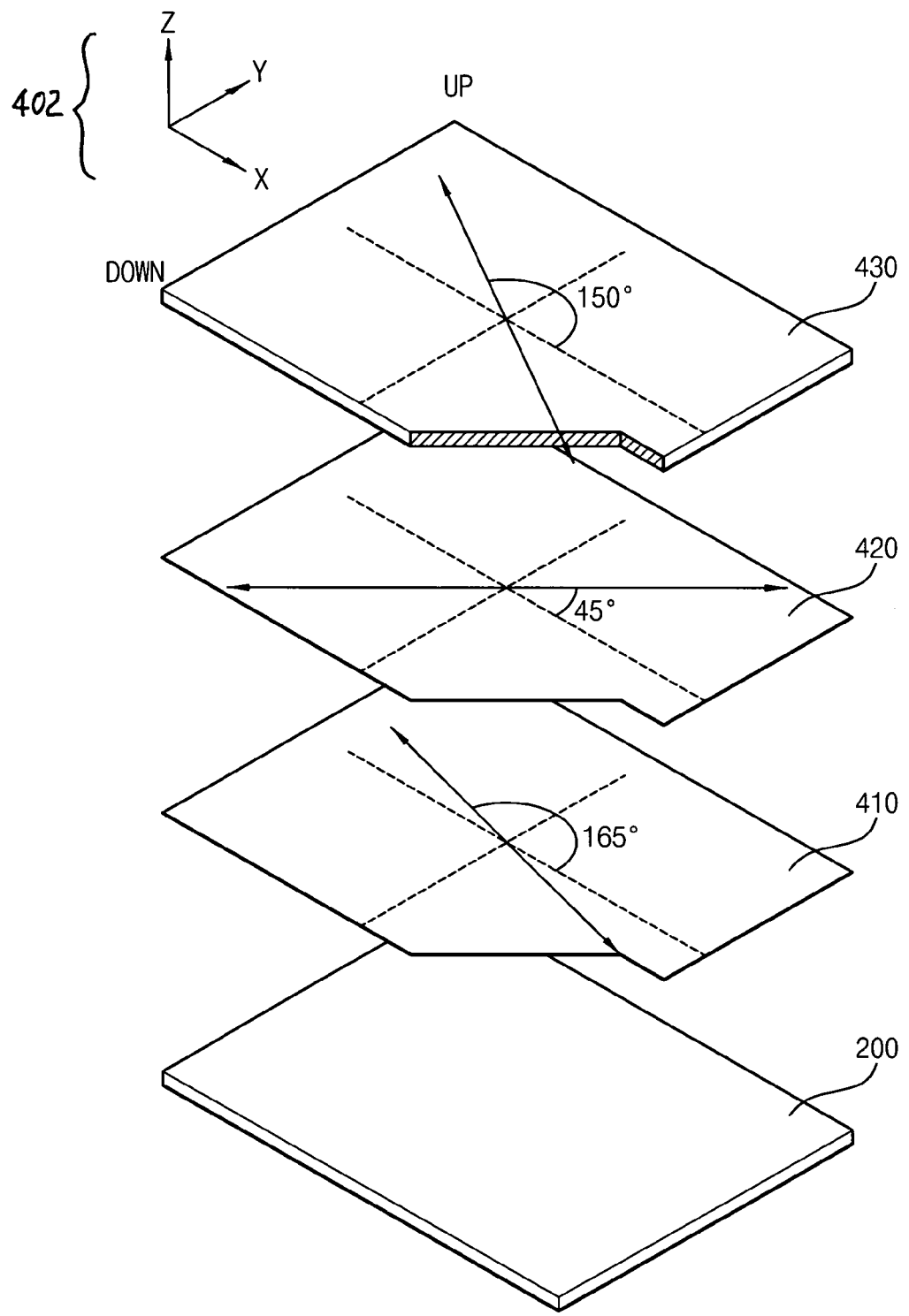
FIG. 3 is a perspective view combined with a partial cross-sectional view of an upper optical film assembly according to an exemplary embodiment of the invention.
Figure 4:
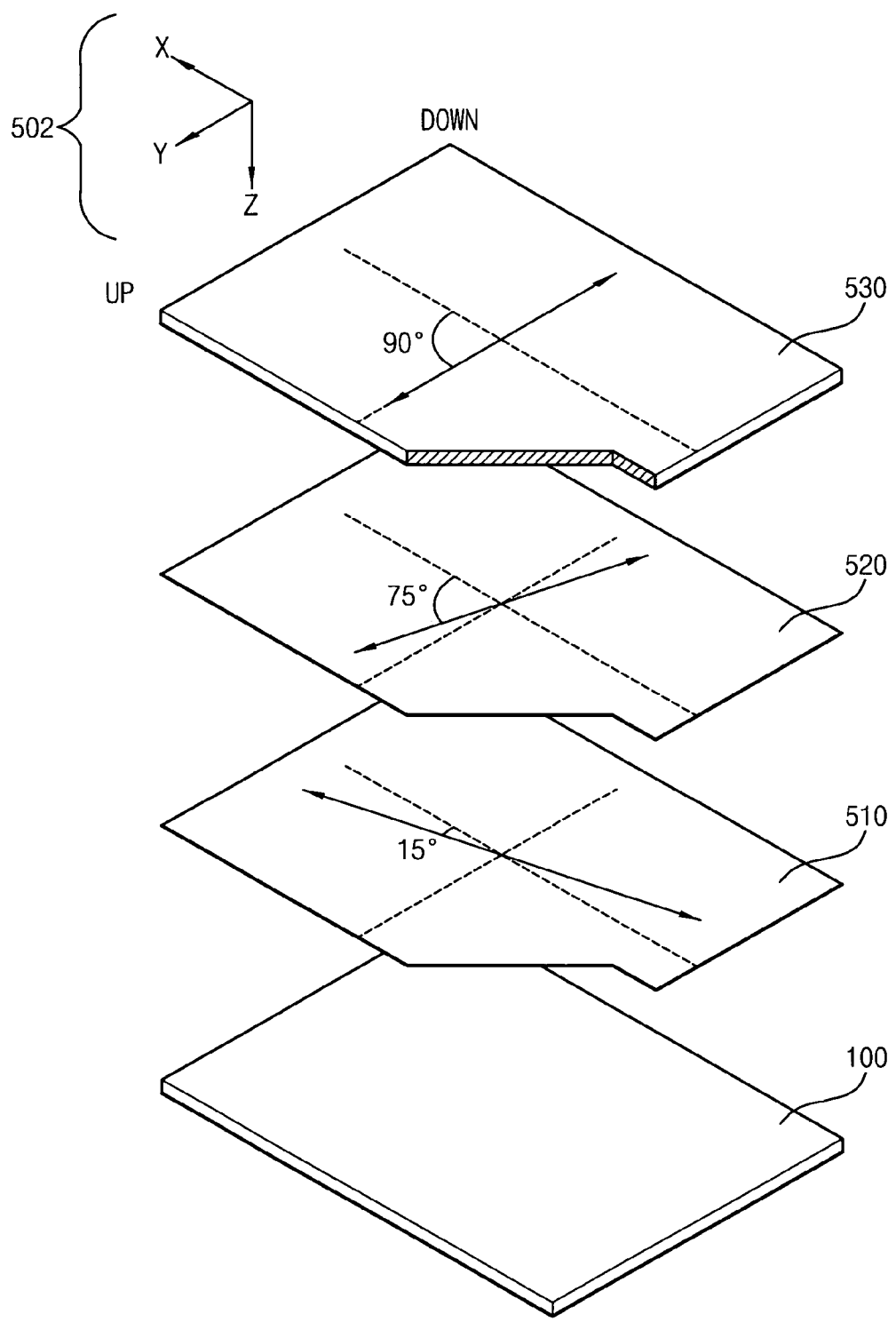
FIG. 4 is a perspective view combined with a partial cross-sectional view of a lower optical film assembly according to an exemplary embodiment of the invention.

FIG. 3 is a perspective view, partially in cross-sectional view form, showing the second optical film assembly 400 according to an exemplary embodiment of the invention, and FIG. 4 is a perspective view, partially in cross-sectional view form, showing the first optical film assembly 500 according to an exemplary embodiment of the invention. In FIG. 3 and FIG. 4, the slow axes of the retardation films 410, 420, 510, 520 are shown by solid lines with arrows. For the polarizers 430, 530, the solid lines with arrows indicate the optical absorption axis. Light passing through the retardation film experiences a phase delay if the light includes a vector component parallel to the slow axis of the retardation film because the light component parallel to the slow axis has slower velocity than the light component that is perpendicular to the slow axis. Light that is polarized in the direction of the optical absorption axis does not pass through the polarizer.

FIGS. 3 and 4 illustrate a case where α ranges from about 0.162λ to about 0.378λ, wherein λ is between about 460 nm and about 550 nm.

In FIG. 3, the second λ/4 retardation film 410 is formed on the second member 200. The phase delay (Δnd) of the second λ/4 retardation film 410 is about 169±10 nm. The slow axis of the second λ/4 retardation film 410 forms about 165±10° counterclockwise from the x axis. The "x axis," when used in reference to FIG. 3, is the x-axis according to a coordinate system 402.

The second λ/2 retardation film 420 is formed on the second λ/4 retardation film 410. The phase delay (Δnd) of the second λ/2 retardation film 420 is about 254±10 nm. The slow axis of the second λ/2 retardation film 420 extends in a direction that lies at about 45±10° counterclockwise from the x axis.

The second polarizer 430 is formed on the second λ/2 retardation film 420. The absorption axis of the second polarizer 430 extends in a direction that lies at about 150±10° counterclockwise from the x axis.

FIG. 4 shows the first λ/4 retardation film 510 that is formed on the first member 100. The phase delay (Δnd) of the first λ/4 retardation film 510 is about 153±10 nm. The slow axis of the lower λ/4 retardation film 510 extends at about 15±10° counterclockwise from the x axis. The "x axis," when used in reference to FIG. 4, is the x-axis according to a coordinate system 502.

The first λ/2 retardation film 520 is formed on the first λ/4 retardation film 510. The phase delay (Δnd) of the first λ/2 retardation film 520 is about 254±10 nm. The slow axis of the first λ/2 retardation film 520 extends at a direction that is about 75±10° counterclockwise from the x axis.

The first polarizer 530 is formed on the first λ/2 retardation film 520. The absorption axis of the lower polarizer 530 extends in a direction that is at about 90±100 counterclockwise from the x axis.

Alternatively, the thickness of the liquid crystal layer 300 in the reflective region may be substantially equal to the thickness of the liquid crystal layer 300 in the opening 145.

In some embodiments, the LCD apparatus may be a reflective LCD apparatus that has the reflective layer 160 but not the opening 145, or a transmissive LCD apparatus that has the pixel electrode 150 but no reflective layer 160.

In some embodiments, the pixel electrode 150 may be disposed under the organic insulating layer 144.

In some embodiments, the transmissive LCD apparatus may include a compensation film having a phase delay of "$-\alpha$," as well as a $\lambda/4$ retardation film (410 and 510) and the $\lambda/2$ retardation film (420 and 520). In some embodiments, the retardation effect of $-\alpha$ is achieved by use of films disposed between the liquid crystal layer 300 and each of the polarizers 430, 530. Between the liquid crystal layer 300 and the second polarizer 530, this $-\alpha$ retardation effect may be achieved by replacing the $\lambda/4$ retardation film 410 with a $(\lambda/4+\alpha)$ retardation film and leaving the $\lambda/2$ retardation film 420 as is. Alternatively, a similar effect can be achieved by replacing the $\lambda/2$ retardation film 420 with a $(\lambda/2+\alpha)$ retardation film and leaving the $\lambda/4$ retardation film 410 as is. Similar adjustments may be made to the $\lambda/4$ retardation film 510 and the $\lambda/2$ retardation film 520 to achieve a total retardation of $(\lambda/4+\alpha)$.

Figure 5A:
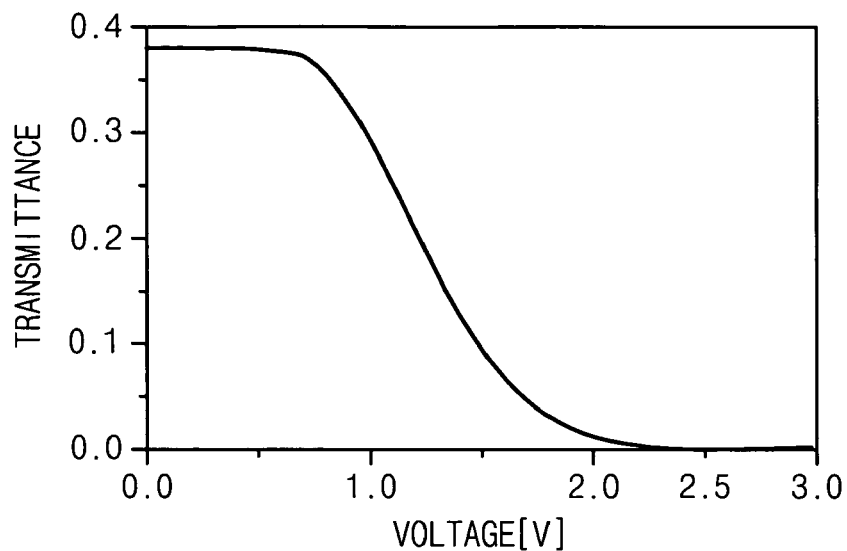
FIG. 5A is a graph of numerical analysis performed for an LCD apparatus operating in transmissive mode according to an exemplary embodiment of the invention.

FIG. 5A is a graph of transmittance as a function of voltage based on a numerical analysis of an LCD apparatus according to an embodiment of the invention. When the data were taken, the LCD apparatus was operating in a transmission mode.

The transmittance of the LCD apparatus was about 0.38 when no data voltage was applied to the gate electrode 110. The transmittance showed a non-linear decrease with the increase in data voltage. The transmittance of the LCD apparatus was about 0 when a data voltage of about 2.3 V was applied to the first member 100.

Figure 5B:
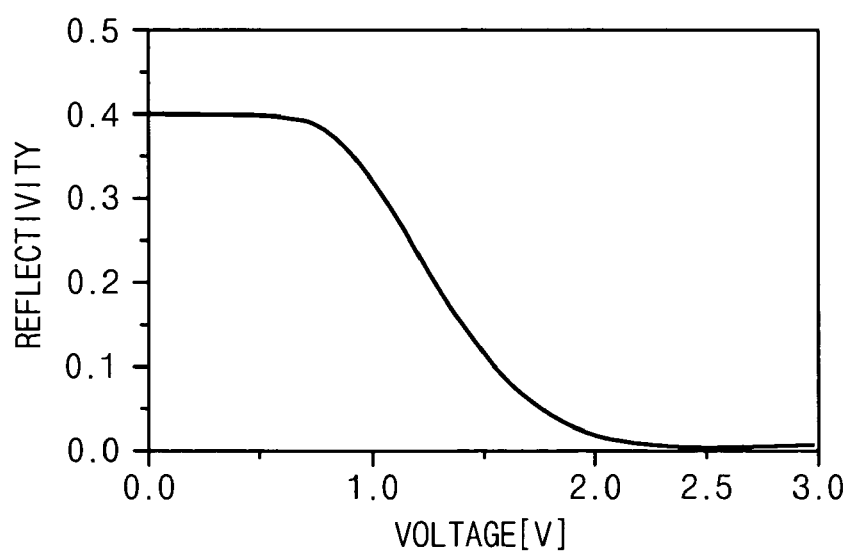
FIG. 5B is a graph of numerical analysis performed for an LCD apparatus operating in reflective mode according to an exemplary embodiment of the invention.

FIG. 5B is a graph of reflectivity as a function of voltage based on a numerical analysis of an LCD apparatus according to an embodiment of the invention. The apparatus was operating in a reflective mode when the data were taken.

The reflectivity of the LCD apparatus was about 0.40 when no data voltage was applied to the gate electrode 110. As shown, the reflectivity decreased non-linearly with the increase in data voltage. The reflectivity of the LCD apparatus was about 0 when a data voltage of about 2.5 V was applied to the first member 100.

Figure 6A:
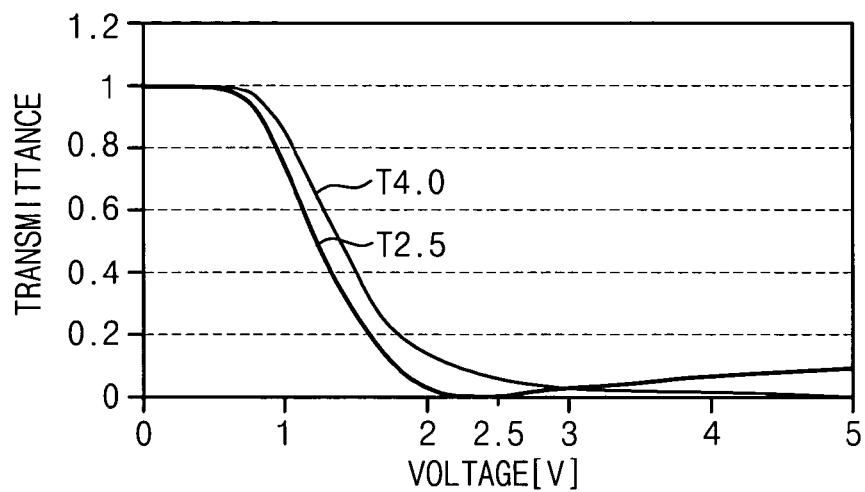
FIG. 6A is a graph of transmittance as a function of voltage for an LCD apparatus of the invention.

FIG. 6A is a graph of transmittance as a function of voltage for an LCD apparatus of the invention operating in the transmissive mode. The driving voltage of a conventional LCD apparatus is about 4.0 V, as shown by the curve labeled "T4.0." The transmittance of the conventional LCD apparatus was about zero when the driving voltage was increased to above 3 V. In contrast, the driving voltage of the LCD apparatus of the invention is about 2.5V, as shown by the curve labeled "T2.5." The transmittance of the LCD apparatus of the invention was about zero when the driving voltage was about 2.3V. Thus, with the invention, the full range of transmittance is achieved at a lower driving voltage.

Figure 6B:
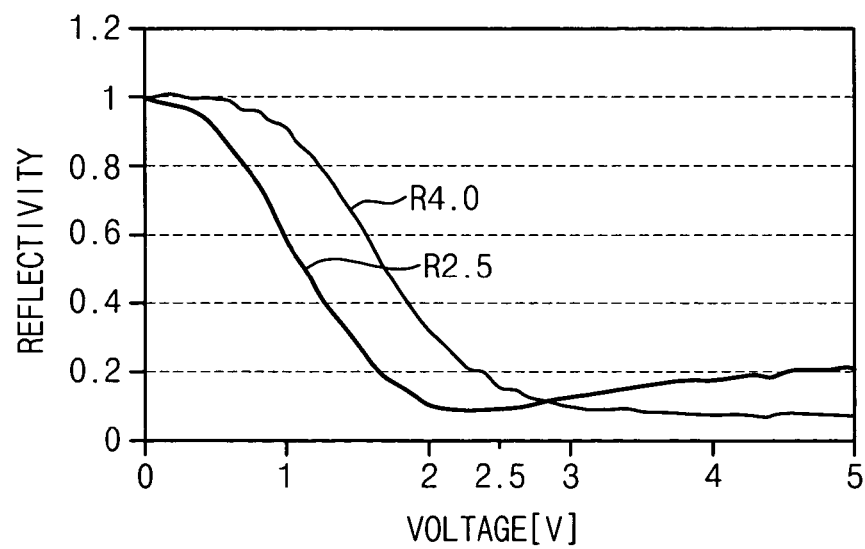
FIG. 6B is a graph of reflectivity as a function of voltage for an LCD apparatus of the invention.

FIG. 6B is a graph of reflectivity as a function of voltage for an LCD apparatus of the invention operating in a reflective mode. As indicated by the label "R4.0," the driving voltage of the conventional LCD apparatus is about 4.0 V. The reflectivity of the conventional LCD apparatus was about 0.1 when the driving voltage was more than 3V. As for the LCD apparatus of the invention, it was driven at about 2.5 V as indicated by the label "R2.5." For the LCD apparatus of the invention, the reflectivity was about 0.1 when the driving voltage was about 2.3V. Thus, the full range of reflectivity is achieved at a lower driving voltage for the apparatus of the invention.

FIG. 7A, FIG. 7B, FIG. 8A, and FIG. 8B are brightness graphs. The angles shown by the concentric circles are polar angles indicating a viewing angle relative to an imaginary line that is orthogonal to the display surface. The angles shown by the straight lines are azimuthal angles indicating an angle relative to an imaginary line that lies in the same plane as the display surface.

Figure 7A:
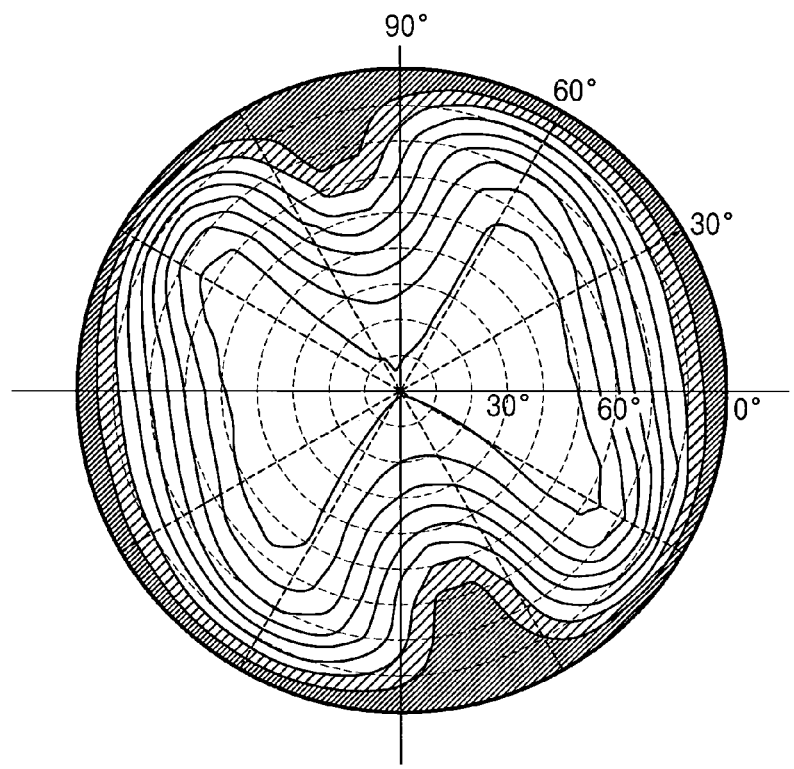
FIG. 7A is a graph of white color as a function of viewing angle for an LCD apparatus of the invention operating in a transmissive mode.

FIG. 7A is a graph of white color as a function of viewing angle for an LCD apparatus operating in the transmissive mode. The center of the circular graph represents the intensity of light emanating from the front of the LCD apparatus, from a direction that is orthogonal to the display surface. The concentric circles represent angles with respect to the line that is orthogonal to the display surface.

The graph shows that a white image, when seen from a direction substantially orthogonal to the display surface, is bright. When the white image is viewed from an angle of about 115° and about 285° counterclockwise from the axis of zero azimuthal angle, the brightness is lower than when the image is viewed from the orthogonal direction.

Figure 7B:
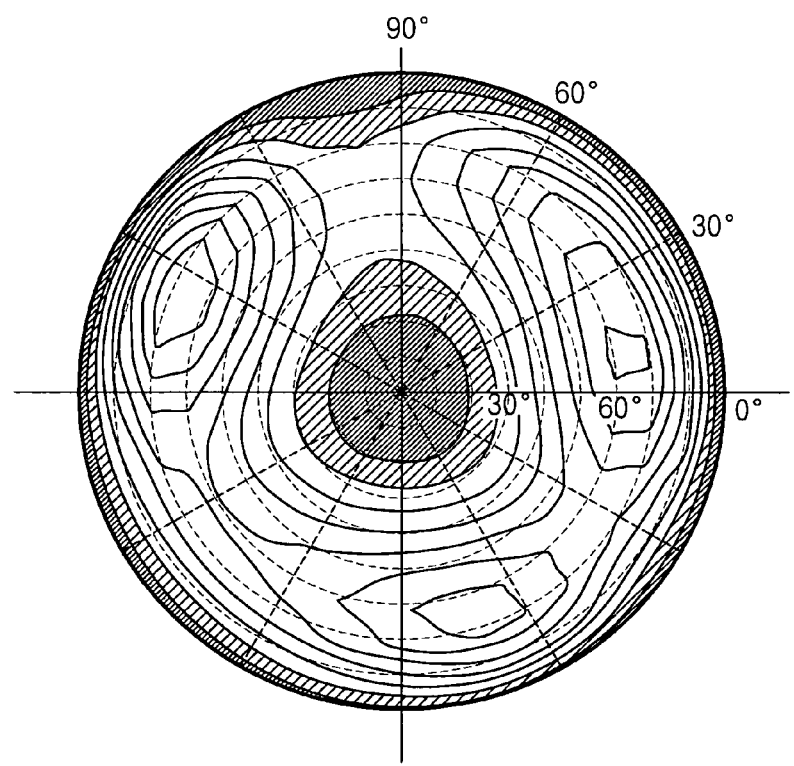
FIG. 7B is a graph of black color as a function of viewing angle for an LCD apparatus of the invention operating in a transmissive mode.

FIG. 7B is a graph of black color as a function of viewing angle for an LCD apparatus operating in the transmission mode. As shown by the dense shading, the image seen from the orthogonal direction was dark (i.e., good black color). When the dark image is viewed from an angle of about 50° to about 70° with respect to the orthogonal direction, the degree of darkness is lower than when the image is viewed from the orthogonal direction.

FIG. 7A and FIG. 7B illustrate that the display quality of the transmission mode corresponding to the direction substantially perpendicular to the front surface of the LCD apparatus was comparable to that of the conventional apparatus even though the driving voltage was no more than 2.5 V.

Figure 8A:
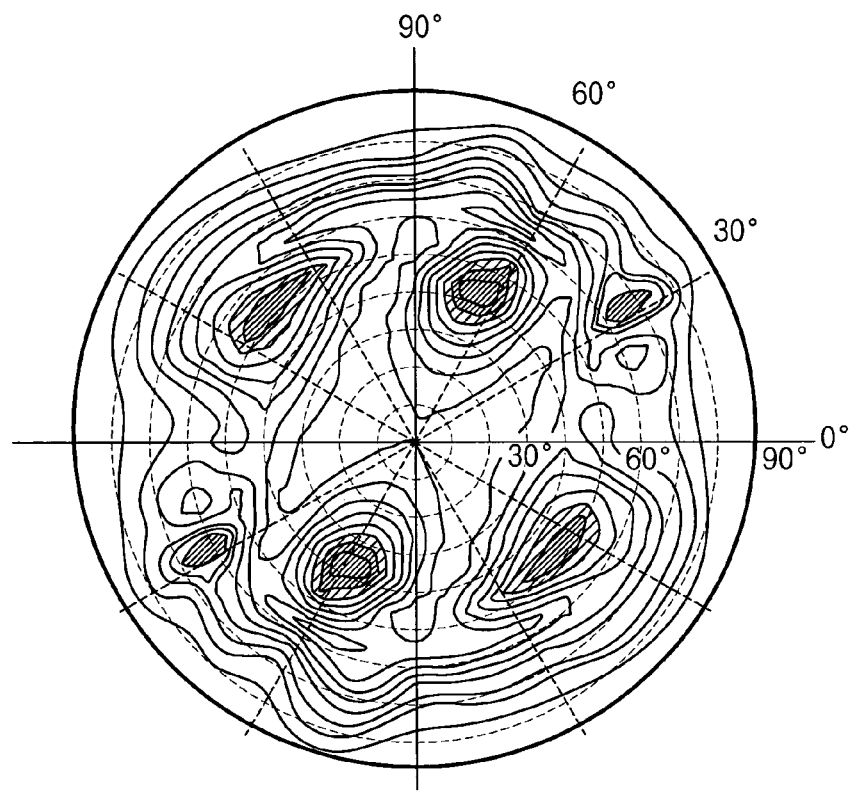
FIG. 8A is a graph of white color as a function of viewing angle for an LCD apparatus of the invention operating in a reflective mode.

FIG. 8A is a graph of white color as a function of viewing angle for an LCD apparatus of the invention operating in the reflective mode. As shown, an image viewed from a direction substantially perpendicular to the front surface of the LCD apparatus was bright. When viewed from about 32°, about 65°, about 145°, about 118°, about 240°, and about 285° counterclockwise with respect to the 0°-axis in the azimuthal coordinates, spots of decreased brightness were seen. These spots generally appear at about 40° to about 60° on the polar coordinate.

Figure 8B:
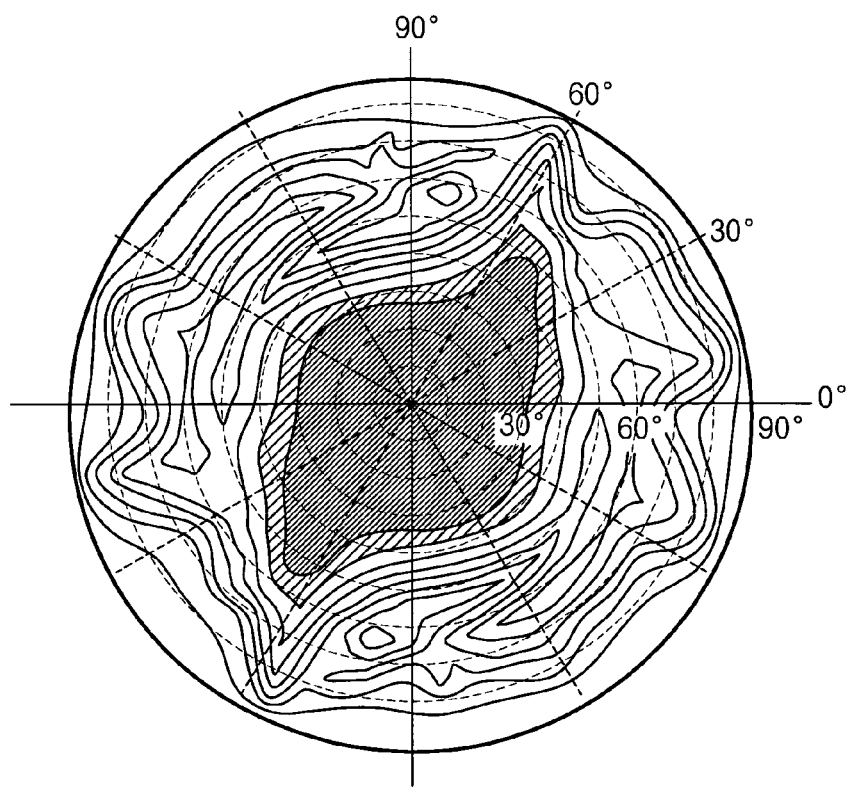
FIG. 8B is a graph of black color as a function of viewing angle for an LCD apparatus of the invention operating in a reflective mode.

FIG. 8B is a graph of black color as a function of viewing angle for an LCD apparatus of the invention operating in the reflective mode. As shown, the image viewed from a direction that is substantially orthogonal to the display surface of the LCD apparatus generally showed good blackness. When viewed from a direction that is more than about 60° with respect to the 0°-axis in the azimuthal coordinates, some spots with reduced blackness were seen.

FIG. 8A and FIG. 8B illustrate that the display quality of the LCD apparatus of the invention operating in the reflective mode is comparable to that of the conventional apparatus, especially from the direction that is orthogonal to the display surface, even though the driving voltage was no more than 2.5 V.

According to aspects of the invention, in the normally white mode, the phase delay of the liquid crystal layer 300 is about $(\lambda/2)+\alpha$ when no voltage is applied. The phase delay of the liquid crystal layer 300 is about "$\alpha$" when a data voltage of no more than 2.5 V is applied to the pixel electrode of the LCD apparatus.

A phase delay between when a voltage is applied to the liquid crystal layer 300 and when no voltage is applied to the liquid crystal layer 300 is about $\lambda/2$. The exact voltage level is determined based on "$\alpha$."

In the normally black mode, the phase delay of the liquid crystal layer 300 is about "$\alpha$" when no voltage is applied, and the phase delay is about $(\lambda/2)+\alpha$ when a data voltage of no more than about 2.5 V is applied to the pixel of the LCD apparatus.

A conventional LCD apparatus includes a step-up transformer such as a charging pump to increase the voltage level from a power supply. For a typical cellular phone, the step-up transformer increases the voltage level from about 2.7 V to about 4.0V, since 4.0V is needed to drive a conventional LCD apparatus. With the LCD apparatus of the invention, this step-up function is not necessary because the driving voltage does not need to be greater than 2.7V.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first member having a first surface and a second surface;
a second member having a third surface and a fourth surface;
a liquid crystal layer positioned between the first member and the second member, wherein the liquid crystal layer generates a phase delay for light passing therethrough;
a voltage application structure for applying a voltage to the liquid crystal layer, wherein the phase delay generated by the liquid crystal layer is varied between ($\lambda/2+\alpha$) and $\alpha$, wherein $\alpha$ has a non-zero value, according to the voltage that is applied; and
a compensation film coupled to at least one of the first member and the second member, wherein the compensation film generates a compensation phase delay of $-\alpha$,
wherein the device operates in a normally white mode, and wherein the phase delay generated by the liquid crystal layer is ($\lambda/2+\alpha$) for a white image when no voltage is applied and $\alpha$ for a black image when the voltage is applied.

2. The device of claim 1, wherein the device has a transmissive region, and wherein the phase delay in the transmissive region is about ($\lambda/2+\alpha$) for the white image when no voltage is applied and is about $\alpha$ for the black image when the voltage is applied.

3. The device of claim 1, wherein the device has a reflective region with a reflective region phase delay, and wherein the reflective region phase delay is about ($\lambda/2+\alpha$)/2 for the white image when no voltage is applied and is about $\alpha/2$ for the black image when the voltage is applied.

4. A liquid crystal display device comprising:
a first member having a first surface and a second surface;
a second member having a third surface and a fourth surface;
a liquid crystal layer positioned between the first member and the second member, wherein the liquid crystal layer generates a phase delay for light passing therethrough;
a voltage application structure for applying a voltage to the liquid crystal layer, wherein the phase delay generated by the liquid crystal layer is varied between ($\lambda/2+\alpha$) and $\alpha$, wherein $\alpha$ has a non-zero value, according to the voltage that is applied; and
a compensation film coupled to at least one of the first member and the second member, wherein the compensation film generates a compensation phase delay of $-\alpha$, wherein the device operates in a normally black mode, and wherein the phase delay generated by the liquid crystal layer is $\alpha$ for a black image when no voltage is applied and is ($\lambda/2+\alpha$) for a white image when the voltage is applied.

5. The device of claim 4, wherein the device has a reflective region with a reflective region phase delay, and wherein the reflective region phase delay is about $\alpha/2$ for the black image when no voltage is applied and is about ($\lambda/2+\alpha$)/2 for the white image when the voltage is applied.

6. The device of claim 4, wherein the device has a transmissive region, and wherein the phase delay generated by the liquid crystal layer is $\alpha$ for the black image when no voltage is applied and ($\lambda/2+\alpha$) for the white image when the voltage is applied.

7. A liquid crystal display device comprising:
a first member having a first surface and a second surface;
a second member having a third surface and a fourth surface;
a liquid crystal layer positioned between the first member and the second member, wherein the liquid crystal layer generates a phase delay for light passing therethrough;
a voltage application structure for applying a voltage to the liquid crystal layer, wherein the phase delay generated by the liquid crystal layer is varied between ($\lambda/2+\alpha$) and $\alpha$, wherein $\alpha$ has a non-zero value, according to the voltage that is applied; and
a compensation film coupled to at least one of the first member and the second member, wherein the compensation film generates a compensation phase delay of $-\alpha$, wherein the phase delay changes by about 10 nm to about 30 nm in response to a change in the voltage by about 0.1 V.

8. The device of claim 7, wherein $\lambda$ is about 460 nm to about 550 nm.

9. The device of claim 7, wherein the value of $\alpha$ is such that:

$$(Vsu-Vth)/(Vs-Vth) \times 0.3\lambda < \alpha < (Vsu-Vth)/(Vs-Vth) \times 0.7\lambda, \text{ wherein}$$

Vsu is a target operating voltage of the liquid crystal display device;
Vs is an intrinsic saturation voltage of a liquid crystal mixture; and
Vth is an actual threshold voltage of the liquid crystal layer.

10. The device of claim 7, wherein the liquid crystal layer is homogeneously aligned.

11. The device of claim 7, wherein the voltage is applied to two electrodes sandwiching the liquid crystal layer.

12. The device of claim 7, wherein the voltage is applied to two electrodes on a same side of the liquid crystal layer.

13. The device of claim 7 further comprising an optical film assembly, wherein the optical film assembly includes a first film assembly coupled to the first member and a second film assembly coupled to the second member.

14. The device of claim 13, wherein the compensation film is positioned between the first member and the first film assembly.

15. The device of claim 13, wherein the compensation film is positioned between the second member and the second film assembly.

16. The device of claim 13, wherein the optical film assembly comprises:
a polarizer;
a first film for generating a phase shift of $\lambda/2$; and
a second film for generating a phase shift of $\lambda/4$.

17. The device of claim 7, wherein the compensation film is a C-plate having a phase shift of $\alpha$ to generate a compensation phase delay of $-\alpha$.

18. The device of claim 7, wherein the liquid crystal layer has a first cell gap in the reflective region and a second cell gap in the transmissive region, wherein the first cell gap generates a phase difference of about 140 nm to about 240 nm for $\lambda$ of about 550 nm.

19. The device of claim 7, wherein the liquid crystal layer has a first cell gap in the reflective region and a second cell gap in the transmissive region, wherein the second cell gap generates a phase delay of about 280 nm to about 480 nm.

* * * * *